US011675933B2

(12) United States Patent
Tan et al.

(10) Patent No.: US 11,675,933 B2
(45) Date of Patent: Jun. 13, 2023

(54) CLIENT AUTHORIZATION MECHANISMS TO ACCESS NATIVE SERVICES

(71) Applicant: DELL PRODUCTS, LP, Round Rock, TX (US)

(72) Inventors: Danilo O. Tan, Austin, TX (US); Srikanth Kondapi, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 41 days.

(21) Appl. No.: 17/218,529

(22) Filed: Mar. 31, 2021

(65) Prior Publication Data
US 2022/0318430 A1 Oct. 6, 2022

(51) Int. Cl.
*G06F 21/64* (2013.01)
*G06F 21/31* (2013.01)
*G06F 21/78* (2013.01)
*H04L 67/568* (2022.01)

(52) U.S. Cl.
CPC .............. *G06F 21/64* (2013.01); *G06F 21/31* (2013.01); *G06F 21/78* (2013.01); *H04L 67/568* (2022.05)

(58) Field of Classification Search
CPC .......... G06F 21/64; G06F 21/31; G06F 21/78; H04L 67/568
See application file for complete search history.

(56) References Cited

U.S. PATENT DOCUMENTS

| 7,865,931 B1* | 1/2011 | Stone .................. G06F 21/31 726/17 |
| 9,231,939 B1* | 1/2016 | Morrison .......... H04L 63/0815 |
| 9,992,022 B1* | 6/2018 | Chapman ............. H04L 9/3236 |
| 10,089,381 B2* | 10/2018 | Fontaine .............. G06F 16/285 |
| 10,326,746 B1* | 6/2019 | Rathbone ............. H04L 63/062 |
| 10,402,748 B2* | 9/2019 | Virkar ...................... G06N 3/02 |
| 10,732,987 B2 | 8/2020 | Sanaullah et al. |
| 10,742,651 B2* | 8/2020 | Clarke .................. H04L 9/0637 |
| 2011/0023096 A1* | 1/2011 | Xiao .................. H04L 63/0236 709/224 |
| 2012/0179907 A1* | 7/2012 | Byrd ..................... H04L 9/3268 713/156 |
| 2014/0283109 A1* | 9/2014 | Quong .................... G06F 21/51 726/27 |
| 2015/0254451 A1* | 9/2015 | Doane ..................... H04L 63/20 726/1 |
| 2017/0149740 A1* | 5/2017 | Mansour ............... H04L 63/045 |
| 2017/0177877 A1* | 6/2017 | Suarez ................ G06F 16/2455 |
| 2017/0346807 A1* | 11/2017 | Blasi .................. H04L 63/0807 |

(Continued)

Primary Examiner — Khalid M Almaghayreh
(74) Attorney, Agent, or Firm — Larson Newman, LLP

(57) ABSTRACT

An information handling system includes a memory to cache a manifest that has authorized programming interfaces of a client application after the manifest was retrieved from the client application. A native service may receive a connection request from the client application, and verify that a digital signature of the client application is valid and untampered. The native service may also retrieve the manifest from the client application, receive an application programming interface request from the client application, and validate whether the application programming interface request is authorized based on the manifest. If the application programming interface request is authorized, then the application programming interface request is processed.

14 Claims, 4 Drawing Sheets

(56) References Cited

U.S. PATENT DOCUMENTS

| | | | |
|---|---|---|---|
| 2018/0007428 A1* | 1/2018 | Veeramani | H04N 21/4431 |
| 2018/0025332 A1* | 1/2018 | Huang | G06Q 20/10 |
| | | | 705/71 |
| 2018/0150764 A1* | 5/2018 | Stenneth | G06Q 50/30 |
| 2019/0229922 A1* | 7/2019 | Galloway | H04L 9/3226 |
| 2019/0253496 A1 | 8/2019 | Tan et al. | |
| 2019/0266070 A1* | 8/2019 | Bhandarkar | G06F 11/3072 |
| 2019/0294527 A1* | 9/2019 | Teitelbaum | H04L 63/083 |
| 2019/0325292 A1* | 10/2019 | Remis | G06F 16/9024 |
| 2019/0387001 A1 | 12/2019 | Sanaullah et al. | |
| 2020/0234829 A1* | 7/2020 | Koymans | G16H 10/20 |
| 2020/0389319 A1* | 12/2020 | Wise | H04L 9/3247 |
| 2021/0036854 A1* | 2/2021 | Dunjic | H04L 9/3213 |
| 2021/0075791 A1* | 3/2021 | Dunjic | H04L 63/0428 |
| 2021/0240551 A1* | 8/2021 | Joyce | G06F 11/3688 |
| 2022/0029822 A1* | 1/2022 | Ubbens | H04L 9/3247 |
| 2022/0066822 A1* | 3/2022 | Patel | G06F 9/505 |

* cited by examiner

CLIENT AUTHORIZATION MECHANISMS TO ACCESS NATIVE SERVICES

FIELD OF THE DISCLOSURE

The present disclosure generally relates to information handling systems, and more particularly relates to client authorization mechanisms to access native services.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory to cache a manifest that has authorized programming interfaces of a client application after the manifest was retrieved from the client application. A native service may receive a connection request from the client application, and verify that a digital signature of the client application is valid and untampered. The native service may also retrieve the manifest from the client application, receive an application programming interface request from the client application, and validate whether the application programming interface request is authorized based on the manifest. If the application programming interface request is authorized, then the application programming interface request may be processed.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
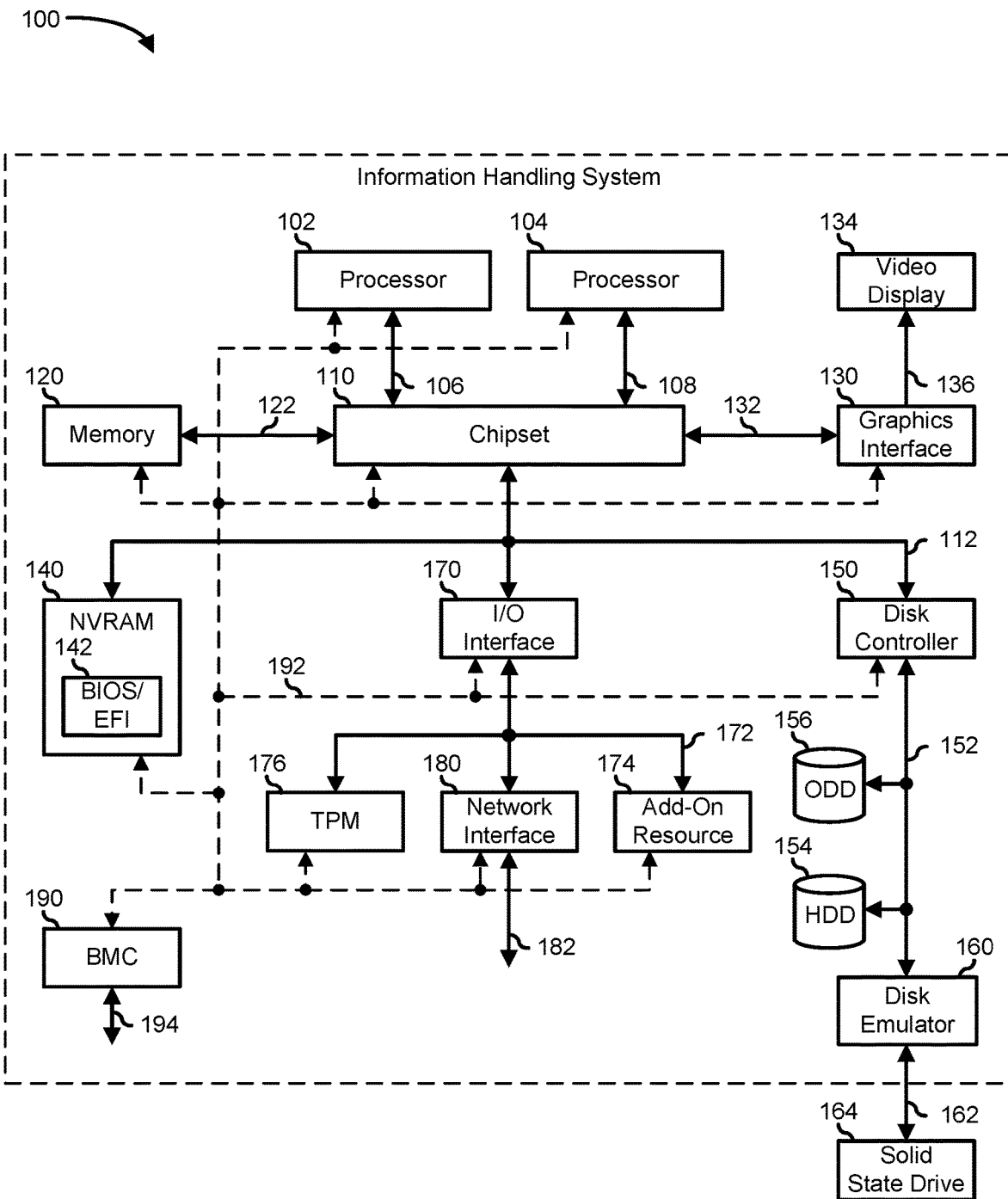
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM)

devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on a separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi™ channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Enterprise, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill in the art will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Software solutions typically involve two main components: a client application that provides the user interface and a service that provides capabilities associated with the user interface. Given that the service may provide elevated access and potentially shared data, it is desirable that the service can trust the client application. Generally, services may operate with blanket security levels, such as full or limited access. For example, a system service provides full access while a network service provides limited access. The system service may be configured with elevated privileges, such as a local system or administrator, to perform updates. However, this may make the application vulnerable to attacks like a dynamic-link library (DLL) attack where a malicious program can attach its library into a process and execute code as if it is part of the process.

When the service receives a connection request from the client application, the service typically authenticates the client before granting the connection request. After the connection request is granted, the client may send a service request and/or an API request to perform one or more operations. Because no authorization is performed on subsequent service requests, an attacker can perform a DLL injection attack on the client after the initial authentication to access unauthorized sensitive/elevated operations that are supported by the service. For example, the DLL injection attack may be configured to execute malicious code including the information handling system and probably its data. Thus, it may be desirable for the service to limit access to the client application so that the attack surface is smaller. To address these and other concerns, the present disclosure adds a layer of security between the client application and the service by including an authorization layer. The service may only allow client applications with the correct authorization to execute certain APIs and/or capabilities.

Figure 2:
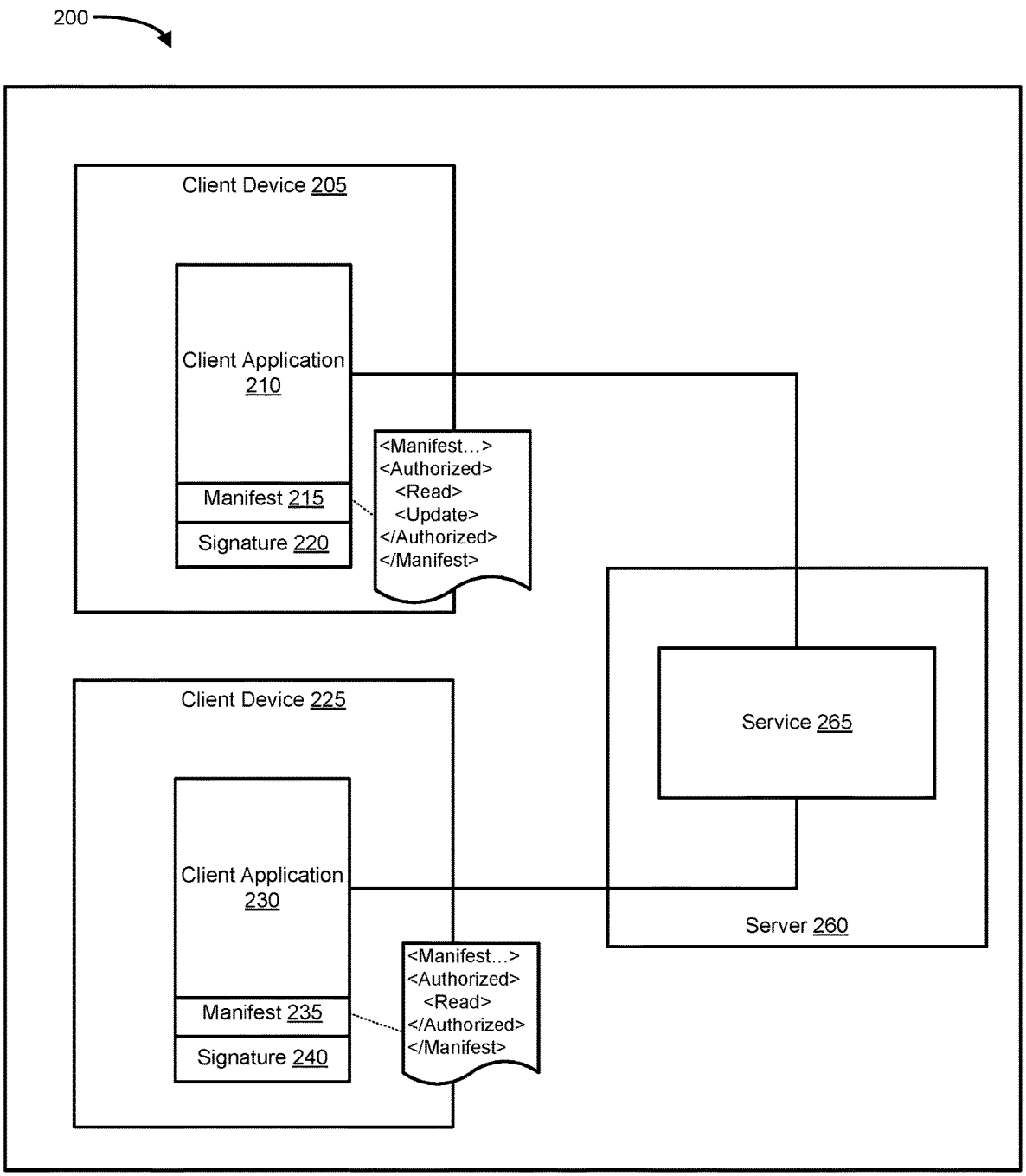
FIG. 2 is a block diagram illustrating a system for client authorization mechanisms to access native services, according to an embodiment of the present disclosure.

FIG. 2 shows a system 200 where systems and methods for client authorization mechanism to access native services may be implemented. System 200 may be an application services system that is configured to provide a common application platform for devices on a particular operating system. System 200 may be configured to provide services between one or more servers and clients, such as the Universal Windows Platform (UWP) system. System 200 includes a client device 205, a client device 225, and a server 260 which includes a service 265. Client device 205 includes a client application 210, a manifest 215, and a signature 220. Client device 225 includes a client application 230, a manifest 235, and a signature 240. Client device 205, client device 225, and server 260 may reside in the same system, such as system 200. System 200 may include additional or fewer components than shown. System 200 and its various components may be implemented using hardware, software, or any combination thereof. In addition, connections between components may be omitted for clarity.

Server 260, which is similar to information handling system 100 of FIG. 1, may be a stand alone computing device or may be an individual blade in a rack of servers. In particular, server 260 may be a desktop computer, a laptop computer, a corporate server, a web server, a platform application server, an application server, or any suitable information handling system. Server 260 may be configured to host a service 265 that is configured to run an operation and/or process on an operating system of client device 205 and client device 225. Service 265 may be a native service that provides additional capabilities such as privilege escalation and background operations. Service 265 may include APIs that can run on any operating system of client device 205 and client device 225. For example, service 265 may be a UWP service provider configured to run on any client device that runs Windows™ operating system. Although examples herein refer to Windows™ operating system, service 265 may be configured to run on any operating system such as Linux™, Unix™, macOS™, iOS™, etc.

Client device 205 and client device 225, which are similar to information handling system 100 of FIG. 1, may be a desktop computer, a laptop computer, a tablet computer, a handheld device, a cellular phone, a notebook computer, or any suitable information handling system. Client device 205 and client device 225 may communicate with server 260 via one or more Inter Process Communication (IPC) protocols such as named pipes, remote procedure protocol (RPC), or any suitable protocol or combination of protocols.

Client device 205 and client device 225 may be configured to host client application 210 and client application 230 respectively. Client application 210 and client application 230 may be applications that are configured to interact with service 265 by making requests for service through defined APIs. The APIs may be used by service 265 with client application 210 and/or client application 230 to interact with the operating system and/or devices of the client device. In one embodiment, an agent may be used by client application 210 and client application 230 to run with elevated access in the operating system. In particular, client application 210 and client application 230 may be a UWP application programmed to execute within a Microsoft™ operating system environment, an Android™ application programmed to execute within an Android™ operating system environment, or another type of application programmed to operate in various operating systems such as Linux™ UNIX™, macOS™, iOS™, etc.

Client application 210 and client application 230 may include a user interface, such as a command-line interface or a graphical user interface. The user interface may include any instrumentality or aggregation of instrumentalities by which a user may interact with an information handling system. For example, the user interface may permit a user to input data and/or instructions to the client devices and/or otherwise manipulate the client devices and their associated components. The user may input data and/or instructions via a keypad, keyboard, touch screen, microphone, camera, and/or other data input device. The user interface may also permit the information handling system to communicate data to a user via a display device, speaker, and/or other data output device. The user interface may include one or more of a display, microphone camera, and speaker.

Manifest 215 and manifest 235 may be used in declaring authorized capabilities and/or APIs of client application 210 and client application 230 respectively. In addition, manifest 215 and manifest 235 may be used in declaring access to resources of client device 205 and client device 225 respectively. Manifest 215 may include information regarding capabilities of client application 210, such as privilege escalation, system administration privileges, access to one or more devices, performing background operations, etc. For example, although manifest 215 and manifest 235 includes "read" and "update" operations, other operations including but not limited to "write," "configure," "monitor," etc. may be supported via the manifest. Manifest 215 may be generated at build time of client application 210's client code. In addition, manifest 215 may be attached to a custom data segment located at the end of a client image of client application 210. Similar to manifest 215, manifest 235 may be generated at build time of client application 230's client code and attached to a custom data segment located at the end of a client image of client application 230. Manifest 235 may include information regarding requested capabilities of client application 230, such as privilege escalation, system administration privileges, performing background operations, etc.

Signature 220 and signature 240 may be generated at build time of the client code of client application 210 and client application 230 respectively. Signature 220 may be used to sign the full client image of client application 210 while signature 240 may be used to sign the full client image of client application 230. The full client image includes the manifest of the client application. For example, the full client image of client application 210 includes manifest 215, and the full client image of client application 230 includes manifest 235.

The signatures may be used to authenticate the identity of the signer of the full client image and to certify that the full client image has not been modified or tampered with since it was signed. Because the full client image includes the manifest when signed, the signature may also be used to verify that the manifest has not been modified or tampered with since it was signed. Signature 220 and signature 240 may be used to encrypt the full client image according to a public/private cryptography scheme. Typically, the developer or manufacturer may sign the full client image by encrypting a portion of or the full client image with a confidential private key specific to the developer or the manufacturer. A public key corresponding to the private key may be published which could be used to decrypt and authenticate the full client image.

Those of ordinary skill in the art will appreciate that the configuration, hardware, and/or software components of system 200 depicted in FIG. 2 may vary. For example, the illustrative components within information handling system 200 are not intended to be exhaustive, but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
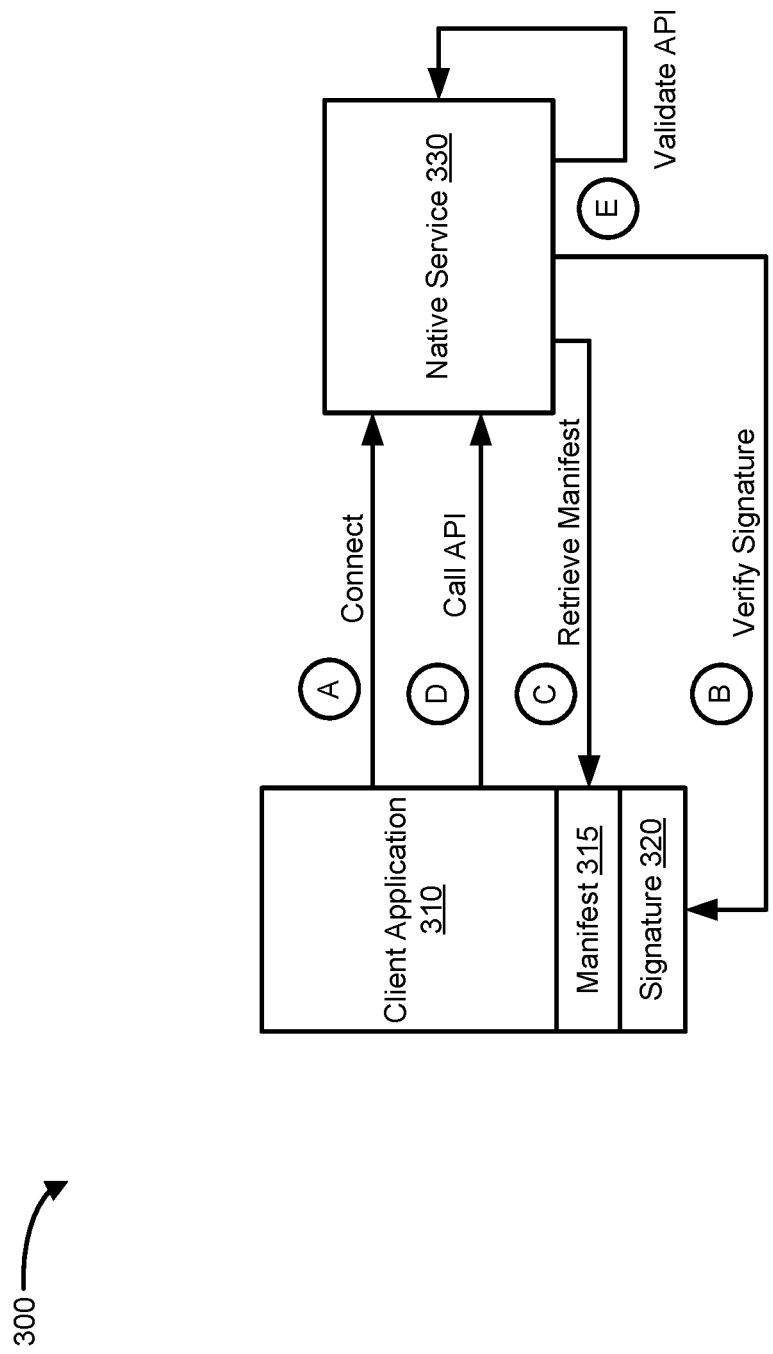
FIG. 3 is a block diagram illustrating a system for client authorization mechanisms to access native services, according to an embodiment of the present disclosure.

FIG. 3 shows a system 300 where systems and methods for client authorization mechanism to access native services may be implemented. System 300 is similar to system 200 of FIG. 2. System 300 includes a client application 310, a manifest 315, a signature 320, and a service 330. System 300 may include additional or fewer components than shown. In addition, connections between components may be omitted for clarity.

Client application 310 which is similar to client application 210 and client application 230 of FIG. 2 may be configured to communicate with service 330. In one environment, client application 310 may communicate with service 330 using one or more APIs. The APIs may be used to allow access to one or more components of the client device hosting client application 310. For example, an API may be used to access a processor, BIOS, I/O interface, etc. The API may also be used to perform an operation such as to update the BIOS, a firmware, retrieve content from a storage device, etc. In a particular embodiment, the API is native to an operating system of the client device. As such, the API may include one or more of a suitable native library or a suitable driver of the operating system. Furthermore, the native libraries and/or drivers may allow software or application to communicate with one or more components of the client device. One or more of the APIs may be protected via authentication and/or authorization mechanism, wherein the authorization of the protected APIs is handled at the application and/or service level without the help of the operating system.

FIG. 3 is annotated with a series of letters A-E. Each of these letters represents a stage of one or more operations at runtime. Although these stages are ordered for this example, the stages illustrate one example to aid in understanding this disclosure and should not be used to limit the claims. Subject matter falling within the scope of the claims can vary with respect to the order of the operations.

At stage A, client application 310 may initiate a connection with service 330. Similar to service 265 of FIG. 2, service 330 may be a native service, a system service, etc. Client application 310 may initiate the connection by sending a connection request and optional credentials such as login name and password.

At stage B, given that service 330 may provide elevated access and potentially shared data, service 330 should trust the client initiating the connection. Service 330 may verify that the full client image has been signed by an authorized signatory and is untampered. Signature 320 may have been generated based on the on-disk image of the code of client application 310 at build time. If signature 320 has been successfully verified, then the operation may proceed to stage C. Otherwise, the operation may end, and service 330 may disconnect from client application 310.

At stage C, service 330 may retrieve the custom data segment that encapsulates manifest 315. Manifest 315, which is similar to manifest 215 of FIG. 2 includes allowed capabilities and/or authorized APIs of client application 310. This limits the capability of a DLL-injection type of attack even to access unauthorized sensitive and/or elevated operations supported by service 330 even if the DLL-injection type of attack was able to circumvent client authentication. Service 330 proceeds to cache manifest 315 in a memory, wherein manifest 315 may be used in automatically determining authorization of API calls from client application 310.

At stage D, client application 310 sends a service request to service 330. The service request may include an API request to utilize a device-specific function of a device of the information handling system, a request to access device capabilities of a device of the information handling system, a request to perform a firmware or software update, and a request to communicate with a second client application of the information handling system. In addition, client application 310 may send information that could be used by service 330 to identify the service requested, an executable file that may be used for the service requested, and other information that may be used in processing the service request.

At stage E, service 330 determines whether the service request is authorized against the cached manifest. If the service request is authorized, then service 330 may proceed with the request. Otherwise, the service request is not performed and the connection of service 330 with client application 310 may be terminated.

Figure 4:
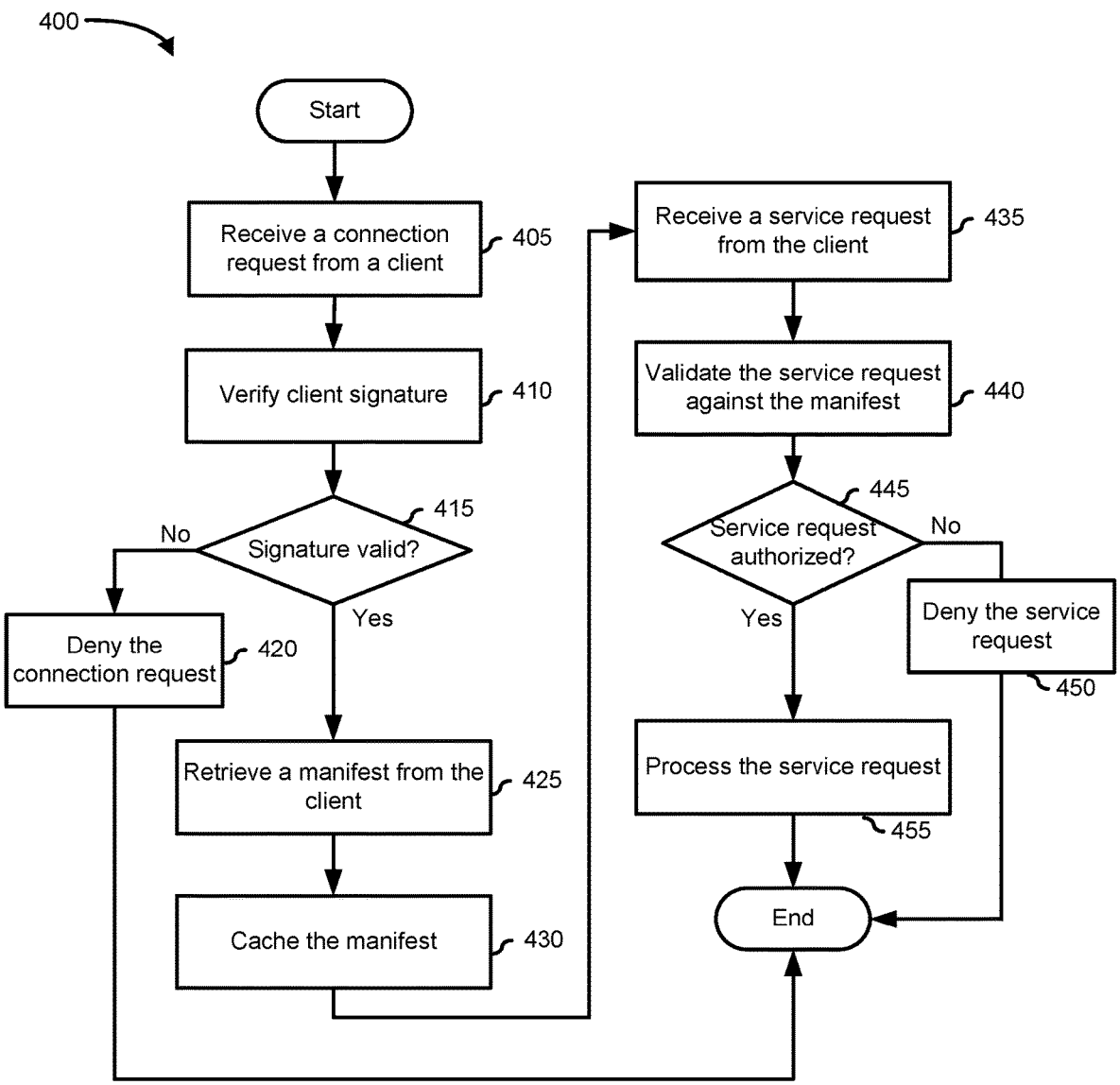
FIG. 4 is a flowchart illustrating a method for client authorization mechanisms to access native services, according to an embodiment of the present disclosure.

FIG. 4 shows a flowchart of a method 400 for performing client authorization mechanisms to access native services. Method 400 may be performed by one or more components of FIG. 2 and/or FIG. 3. In particular, method 400 may be performed by service 265 of FIG. 2 and/or service 330 of FIG. 3. However, while embodiments of the present disclosure are described in terms of client authorization system 200 of FIG. 2 and/or 300 of FIG. 3, it should be recognized that other systems may be utilized to perform the described method. One of skill in the art will appreciate that this flowchart explains a typical example, which can be extended to advanced applications or services in practice.

Method 400 typically starts at block 405, where the method receives a connection request from a client application or is simply referred to herein as a client. The connection request may include a digital signature of an image of the client. The image of the client may be signed by the developer of the client code. The developer of the client code may also be a manufacturer of an information handling system that hosts the client. The method proceeds to block 410 where the method verifies the digital signature and proceeds to decision block 415. At decision block 415, the method determines whether the digital signature is valid. If the digital signature is valid, the "YES" branch is taken and the method proceeds to block 425. If the digital signature is not valid, the "NO" branch is taken and the method proceeds to block 420.

At block 420, the method may deny the connection request received from the client. Afterwards, the method ends. At block 425, the method may retrieve a manifest or a data segment that encapsulates the manifest from the client. The manifest includes information associated with the allowed capabilities, authorized service requests, and/or authorized APIs of the client. The manifest may also include information associated with disallowed capabilities, unauthorized service requests, and/or unauthorized APIs of the client. Because the manifest is part of the full client image, the manifest has also been verified to be tamper-free. The method proceeds to block 430, where the method caches the manifest which allows for an efficient API validation.

The method proceeds to block 435, where the method receives a service request from the client. The method may receive the service request from the client device via a local area network (LAN) and/or an inter-process communication channel. The service request may include an API request to utilize a component-specific function of the client device, a request to access capabilities of the client device or a component thereof, a request to communicate with another client device, etc. The method proceeds to block 440, where the method validates the service request against the manifest that has been cached. The method proceeds to decision block 445, where the method determines whether the service request is authorized. If the service request is authorized, then the "YES" branch is taken and the method proceeds to block 455. If the service request is unauthorized, then the "NO" branch is taken and the method proceeds to block 450.

At block 450, when the authorization of the service request fails, the service request may be denied. After denying the service request, the method ends. Conversely, at block 455, when the authorization of the service request succeeds, the service request may be processed. After processing the request, the method ends.

Although FIG. 4 shows example blocks of method 400 in some implementation, method 400 may include additional blocks, fewer blocks, different blocks, or differently arranged blocks than those depicted in FIG. 4. Additionally, or alternatively, two or more of the blocks of method 400 may be performed in parallel. For example, block 430 and block 435 of method 400 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
receiving, by a processor, a connection request from a client application;
verifying that a digital signature of the client application is valid and untampered;
retrieving a custom data segment encapsulating a manifest, wherein the custom data segment is located at an end of an image of the client application;
subsequent to the verifying that the digital signature is valid and untampered, retrieving the manifest generated at build time of the client application, wherein the manifest includes authorized application programming interfaces and unauthorized application programming interfaces of the client application;
validating whether an application programming interface request received from the client application is authorized based on the authorized application programming interfaces included in the manifest;
in response to validating that the application programming interface request is authorized, processing the application programming interface request; and
in response to validating that the application programming interface request is unauthorized, terminating the connection request from the client application.

2. The method of claim 1, wherein the manifest further includes capabilities of the client application.

3. The method of claim 1, further comprising caching the manifest.

4. The method of claim 1, wherein the manifest is encapsulated in a custom data segment.

5. The method of claim 1, wherein the manifest is attached at an end of an image of the client application.

6. The method of claim 1, wherein the digital signature is used to sign an image of client code that includes the manifest.

7. The method of claim 1, wherein the processor is configured to host a native service.

8. An information handling system, comprising:
a memory to cache a manifest generated at build time of a client application that includes authorized programming interfaces and unauthorized application programming interfaces of the client application after the manifest was retrieved from the client application; and
a native service configured to:
receive a connection request from the client application;
retrieve a custom data segment encapsulating the manifest, wherein the custom data segment is located at an end of an image of the client application;
verify that a digital signature of the client application is valid and untampered;
subsequent to a verification that the digital signature is valid and untampered, retrieve the manifest from the client application;
receive an application programming interface request from the client application;
validate whether the application programming interface request is authorized based on the manifest;
if the application programming interface request is authorized, then process the application programming interface request; and if the application programming interface request is unauthorized, then terminate the connection request from the client application.

9. The information handling system of claim 8, wherein the manifest is encapsulated in a custom data segment at an end of an image of the client application.

10. The information handling system of claim 8, wherein the digital signature is used to sign an image of client code that includes the manifest.

11. A non-transitory computer readable medium including code that when executed performs a method, the method comprising:

receiving a connection request from a client application;

verifying whether a digital signature of the client application is valid and untampered;

retrieving a custom data segment encapsulating a manifest, wherein the custom data segment is located at an end of an image of the client application;

subsequent to verifying that the digital signature is valid and untampered, retrieving the manifest generated at build time of the client application that includes authorized application programming interfaces and unauthorized application programming interfaces of the client application;

validating whether an application programming interface request received from the client application is authorized based on the authorized application programming interfaces included in the manifest;

in response to validating that the application programming interface request is authorized, processing the application programming interface request; and in response to validating that the application programming interface request is unauthorized, terminating the connection request from the client application.

12. The non-transitory computer readable medium of claim 11, wherein the manifest includes capabilities of the client application.

13. The non-transitory computer readable medium of claim 11, wherein the method further comprises caching the manifest.

14. The non-transitory computer readable medium of claim 11, wherein the digital signature is used to sign an image of client code that includes the manifest.

* * * * *